(12) United States Patent
Shu et al.

(10) Patent No.: US 7,949,883 B2
(45) Date of Patent: May 24, 2011

(54) CRYPTOGRAPHIC CPU ARCHITECTURE WITH RANDOM INSTRUCTION MASKING TO THWART DIFFERENTIAL POWER ANALYSIS

(75) Inventors: David B. Shu, West Hills, CA (US); Lap-Wai Chow, South Pasadena, CA (US); William M. Clark, Jr., Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 937 days.

(21) Appl. No.: 10/864,568

(22) Filed: Jun. 8, 2004

(65) Prior Publication Data
US 2005/0273631 A1 Dec. 8, 2005

(51) Int. Cl.
G06F 11/30 (2006.01)
G06F 12/14 (2006.01)

(52) U.S. Cl. ............................ 713/190; 713/194; 726/22

(58) Field of Classification Search .......... 713/189–194; 726/22
See application file for complete search history.

(56) References Cited

U.S. PATENT DOCUMENTS

| | | | | |
|---|---|---|---|---|
| 5,560,000 A * | 9/1996 | Vogley | ........................... | 713/501 |
| 5,866,933 A | 2/1999 | Baukus et al. | ................ | 257/368 |
| 5,944,833 A | 8/1999 | Ugon | ............................ | 713/400 |
| 6,060,908 A | 5/2000 | Heyne et al. | ..................... | 326/93 |
| 6,076,161 A | 6/2000 | Ho | | |
| 6,208,135 B1 | 3/2001 | Shattil | ........................... | 324/225 |
| 6,294,816 B1 | 9/2001 | Baukus et al. | ................ | 257/368 |
| 6,295,606 B1 | 9/2001 | Messerges et al. | ........... | 713/189 |
| 6,298,135 B1 | 10/2001 | Messerges et al. | ............... | 380/1 |
| 6,298,153 B1 | 10/2001 | Oishi | ............................ | 382/186 |
| 6,317,820 B1 * | 11/2001 | Shiell et al. | ..................... | 712/32 |
| 6,408,075 B1 | 6/2002 | Ohki et al. | ...................... | 380/28 |
| 6,613,661 B1 | 9/2003 | Baukus et al. | ................ | 438/598 |
| 6,715,010 B2 | 3/2004 | Kumata | ........................... | 710/71 |
| 6,839,847 B1 * | 1/2005 | Ohki et al. | ..................... | 713/194 |
| 7,127,620 B2 | 10/2006 | Boeckeler | | |
| 2001/0025344 A1 | 9/2001 | Teglia | ........................... | 713/200 |
| 2002/0131596 A1 | 9/2002 | Boeckeler | ..................... | 380/252 |
| 2002/0169968 A1 | 11/2002 | Gammel et al. | ............. | 713/189 |
| 2003/0005321 A1 | 1/2003 | Fujioka et al. | ................ | 713/193 |
| 2003/0044003 A1 | 3/2003 | Chari et al. | ..................... | 380/28 |

(Continued)

FOREIGN PATENT DOCUMENTS

DE 199 36 939 A1 4/2000

(Continued)

OTHER PUBLICATIONS

Aigner, M., et al., "Power Analysis Tutorial," *Institute for Applied Information Processing and Communication*, University of Technology, Graz, Austria, pp. 1-15.

"American National Standard Data Encryption Algorithm," *American National Standards Institute, Inc.*, ANSI x3.92-1981, pp. 9-16 (1981).

(Continued)

*Primary Examiner* — Kimyen Vu
*Assistant Examiner* — Yogesh Paliwal
(74) *Attorney, Agent, or Firm* — Ladas & Parry

(57) ABSTRACT

An apparatus and method for preventing information leakage attacks that utilize timeline alignment. The apparatus and method inserts a random number of instructions into an encryption algorithm such that the leaked information can not be aligned in time to allow an attacker to break the encryption.

29 Claims, 5 Drawing Sheets

U.S. PATENT DOCUMENTS

| | | | |
|---|---|---|---|
| 2003/0110390 A1* | 6/2003 | May | 713/194 |
| 2003/0118190 A1 | 6/2003 | Sedlak et al. | 380/277 |
| 2004/0039928 A1 | 2/2004 | Elbe et al. | |
| 2004/0088488 A1* | 5/2004 | Ober et al. | 711/125 |
| 2005/0169462 A1 | 8/2005 | Jung et al. | |
| 2005/0193045 A1 | 9/2005 | Yamamoto et al. | 708/250 |
| 2005/0232430 A1 | 10/2005 | Gebotys | |
| 2005/0273630 A1 | 12/2005 | Shu et al. | 713/189 |

FOREIGN PATENT DOCUMENTS

| | | |
|---|---|---|
| DE | 19845073 | 4/2000 |
| EP | 1 006 492 A1 | 6/2000 |
| EP | 1006492 A1 | 6/2000 |
| EP | 1 098 469 | 5/2001 |
| FR | 2 862 150 | 5/2005 |
| WO | WO 200190854 A1 * | 11/2001 |
| WO | 2004/053662 A2 | 6/2004 |

OTHER PUBLICATIONS

Kocher, P., et al., "Differential Power Analysis," *Cryptography Research of San Francisco*, California, pp. 1-10 (1998).

Kocher, P., et al., "Introduction to Differential Power Analysis and Related Attacks," *Cryptography Research, Inc.*, INTERNET: <http://www.cryptography.com/resources/whitepapers/DPA-technical.html> pp. 1-5 (1998).

Messerges, T.S., "Investigation of Power Analysis Attacks On Smartcards," *Proceedings of USENIX Workshop on Smartcard Technology*, pp. 151-161 (May 1999).

U.S. Appl. No. 10/864,556, filed Jun. 8, 2004, Shu et al.

U.S. Appl. No. 10/864,569, filed Jun. 8, 2004, Shu et al.

* cited by examiner

CRYPTOGRAPHIC CPU ARCHITECTURE WITH RANDOM INSTRUCTION MASKING TO THWART DIFFERENTIAL POWER ANALYSIS

CROSS REFERENCE TO RELATED APPLICATION

This application is related to U.S. patent application Ser. No. 10/864,569 filed on the same date as this application and entitled "Cryptographic Architecture with Random Instruction Masking to Thwart Differential Power Analysis", which application is hereby incorporated herein by reference.

This application is also related to U.S. patent application Ser. No. 10/864,556 filed on the same date as this application and entitled "Cryptographic Bus Architecture with Prevention of Differential Power Analysis", which application is similarly hereby incorporated herein by reference.

BACKGROUND OF THE INVENTION

1. Field of the Invention

This invention describes a new Central Processing Unit (CPU) architecture that allows camouflaging of the encryption program running in an on-chip cryptographic system or smart card. Using this architecture can resist reverse engineering through Power Analysis or Differential Power Analysis (DPA). This CPU architecture may be conveniently used with RISC (Reduced Instruction Set Computer) CPUs.

2. Description of Related Art

Cryptographic techniques are well-known in the art. Indeed, they date from at least the time Caesar when the need to keep certain information secret from prying eyes became important enough for people to find ways to disguise the information by means of codes and ciphers.

Today, cryptographic techniques are in a wide array of applications, both governmental and private. One application of cryptographic techniques is to protect information stored in a Smart Card and/or to protect the capabilities of the Smart Card from unauthorized use or modifications. Cryptographic devices, such as Smart Cards, use secret keys to process input information and/or to produce output information. It has been assumed the information stored in a cryptographic device, such as a Smart Card, was relatively safe from attack provided that an especially strong cryptographic technique is utilized.

Modern cryptography utilizes transposition and substitution of digital data. Messages to be encrypted, known as plaintext, are transformed by a function that is parameterized by a key. The output of the encryption process, known as the ciphertext, is then transmitted. The received ciphertext is then decrypted using a key, back into plaintext.

One example where modern cryptography is used is in pay-TV conditional-access systems such as pay channels for cable and satellite television. Smart cards and/or security processors (containing secret keys) are used to decrypt the television signals. Attackers buy a cable or satellite receiver and then attack the smart card or security processor inside in order to determine the secret keys. The cipher text is the information sent from the cable or satellite provider, and the plaintext is the decrypted television signal set to the television. Thus, it is generally assumed that the input and output information, i.e. the plaintext and ciphertext, is available to attackers, and information about the secret keys is unavailable. FIG. 1 depicts a cryptographic system. An attacker may attack the smart card or security processor by looking for information related to the secret keys that may be leaked via EM radiation, power consumption, timing etc. The leaked information, commonly referred to as side channel information, can then be used by attackers in order to determine the secret key used. One common technique for determining a secret key from leaked or side channel information is known as Differential Power Analysis (DPA). Unfortunately, there is no way to guarantee that power consumption, EM radiation, etc. will not leak certain cryptographic process information being performed by a device and thus obtain information about the secret keys. Therefore, there is a need defensive techniques that result in leaked information that is un-usable by hackers using correlation techniques such as DPA.

The following background discussion is provided in order to supply a context for one application of the presently disclosed technology, which involves a well-known cipher, the data encryption standard (DES), for which DPA analysis is commonly used to break. One skilled in the art will appreciate that this discussion is for illustration purposes only, and that the present invention may be utilized to protect secret keys of a number of data encryption formats from a number of hacking techniques in which side channel information is used in order to determine the secret keys.

The well-known DES cipher utilizes a number, typically 16, of substitution box (S-Box) functions. The S-Box functions are non-linear and can be implemented by using table lookups, Boolean logic or appropriately programmed computers.

It has been discovered within the past several years that DPA can be utilized by attackers to determine the secret keys used in cryptographic devices employing DES such as Smart Cards. See, for example, *Differential Power Analysis* published by Paul Coker, et al., Cryptographic Research of San Francisco, Calif. A tutorial on Differential Power Analysis is provided in the article, *Power Analysis Tutorial,* published by Manfred Aigner, et al., of the Institute for Applied Information Processing and Communication, University of Technology, Graz, Austria. In order to utilize the Differential Power Analysis technique, the attacker monitors the power consumption of the cryptographic device. The fluctuations in the power used by the device reflect the operations going on within the device and that, in turn, can be used to glean information about the secret keys stored within the device. While the results have been particularly effective and reported therein with respect to DES and its derivatives, DPA can be used, and has been used, to break other known encryption algorithms.

The cryptographic device can leak other information to the outside world other than just the information which can be gleaned by its power consumption. For example, electromagnetic (EM) radiation can leak information and faulty outputs might show information. Unfortunately, there is no way to guarantee that power consumption, EM radiation, and the like, will not leak certain information, and it is believed that it is impractical to expect cryptographic devices, such as Smart Cards, to be completely leak-free in terms of information being able to be discerned by their power consumption, EM radiation or the like. However, defensive techniques can be used to help ensure that whatever information is leaked cannot be correlated, even if sophisticated statistical approaches are used, for example, in the DPA process. As such, the presently disclosed technology is concerned with making power consumption information difficult to correlate and thus recover the secret keys stored within a cryptographic device, such as a Smart Card.

In the prior art, certain de-correlation techniques do exist. See, for example, U.S. Pat. Nos. 6,295,606 and 6,298,153 to Messerges, et al., and published European Patent Application Number 1,098,469 of Boeckeler. However, these approaches have certain limitations and therefore need improvement. This invention proposes a unique Random Instruction Mask (RIM) as a countermeasure to the DPA process, effectively making power consumption un-correlatable to cipher bit values. The present invention has the following advantages over the techniques of Messerges, Boeckler and others:

(1) More Efficient Calculations: The techniques taught by Messerges et al., slow down the DES algorithm by 300 to 500% due to the regular update of the S-boxes. In the present invention, the DES algorithm will be slowed down by approximately 15%.

(2) More Robust: Even in the presence of leaked information for multiple address locations.

(3) Better Protection: 48-bits of a key can be completely concealed in the last DES round, and (4) Low Power Consumption: There is an increase in power consumption by less than 1% compared to Boeckeler's random current profiling, which increases power consumption to about 200% during cryptographic operations.

The technique for hindering the correlation of side channel data discussed in Boeckler's European Patent Application Number 1,098,469 superimposes a random current profile, based on a secondary clock CLK2, inserted upon the existing CPU profile which is based on a master clock CLK1. Each clock is randomly adjusted in a range between 3-7 MHz. Due to two clocks differing from one another with respect to their center frequencies, the combined current profile is randomized which makes a DPA attacker's job more difficult.

Messerges' U.S. Pat. No. 6,208,135 uses a randomized starting point in the set of target bits so that the various target bits are processed in a randomly different order. This makes it difficult for a DPA attacker to group related target bits from all the plaintexts of interest in order to perform statistical analyses associated with given target bit positions. However, not only does this approach not conceal the information leaked by a data bus; it also cannot prevent a malicious attacker from using this information to reorder the target bit into the correct bit position.

Messerges also developed another technique. See U.S. Pat. No. 6,295,606. This technique uses a random mask to keep the message and key hidden both while they are stored in memory, and during processing by the cryptographic algorithm itself. However, since the mask is randomly changed, new S-boxes must be updated accordingly, and this takes time slowing down the DES algorithm by a factor of three to five. In addition, this kind of masking operation cannot prevent an attacker from gathering a 48-bit partial key from Round Sixteen when the results must be eventually unmasked to provide the correct cipher output. Thus, Messerges' approach becomes vulnerable to DPA after unmasking. With 48 bits now known at Round Sixteen, the remaining six key bits to make 56 can then be exhaustively searched by an attacker. The present approach described herein is computationally faster, and it also can prevent an attacker from gathering the partial key from Round Sixteen of the DES algorithm.

Before discussion of the details of the invention, additional details related to the DES algorithm and DPA attacks are discussed. If the reader is new to this area, further information regarding this topic may be found in our related U.S. patent application Ser. No. 10/864,556 for an intuitive description of how a DPA attack works and in the following articles, P. Kocher, J. Jaffe, and B. Jun, "Introduction to Differential Power Analysis and Related Attacks", 1998, Thomas S. Messergers, Ezzy A. Dabbish, and Robert H. Sloan, "Investigations of Power Analysis Attacks on Smartcards", in Proceedings of USENIX Workshop on Smartcard Technology, Chicago, Ill., May 1999, pp. 151-161, and Manfred Aigner and Elisabeth Oswald, "Power Analysis Tutorial" Institute for Applied Information Processing and Communication University of Technology Graz, Austria. The following discussion provides a context for a detailed explanation of the present invention.

The DES algorithm is an example of an iterative-block cipher. DES is described in detail in ANSI X.392, "American National Standard for Data Encryption Algorithm (DEA)", American Standards institute, 1981, which is incorporated by reference herein. Substitution/permutation box (SP box) functions comprise one of the major components of the DES round function. The SP box functions are non-linear and are conventionally implemented using lookup tables or Boolean logic gates. In each of the sixteen rounds, the DES encryption algorithm performs eight SP box operations, in turn, by accessing sequentially each lookup table (or by using equivalent logic gates). The eight SP boxes each take, as input, a scrambled 6-bit key, (here scrambled means that the key has been XOR-ed and shifted) and produce a 4-bit output target to be accessed by the CPU for OR-ing operations. Each such 6-bit scrambled key is an SP box's entry address. Each SP lookup contains 64 elements. Each element in a nominal DES implementation is 32-bits and embeds a given 4-bit output target. This embedding is described in U.S. patent application Ser. No. 10/864,569 in detail.

Once the relationship between the 4-bit output target and its corresponding SP box's entry is established, then the calculation of a given SP box's entry address is done. In general, a DES algorithm uses shifting instructions running in the CPU to calculate the box's entry address. Both the number of shifting instructions used in a specific SP box's entry address calculation and the time interval between each consecutive access of an SP box will be well known to anyone who is familiar with the DES algorithm. Given this fact, DPA attacks are focused on aligning the power traces of each 4-bit output target of an SP box by referencing the preceding shifting instruction signature unique to that box.

The DPA approach requires finding patterns in the power traces that are indicative of the logic operations being utilized during DES cryptographic work. These are specific to a given SP box, but given that the DES algorithm is so well known, the kind of operations unique to each SP box is also well known. Take as an example SP box 5 (SP5). In order to determine the address calculation for SP5, the attacker looks for a pattern in the power trace that indicates eight shifts. In addition, the DPA attacker knows that the time from the beginning of the eight shifts to the beginning of a next set of shifts is equal to a time $TI_5$ as shown in FIG. 2*a*. Thus, the DPA attacker, when finding this pattern in a power trace, knows that the SP address calculation for SP5 has been found. In addition, the attacker would also know that the information in the power trace for the time slot following the end of the eight shifts would contain the corresponding 4-bit output target. This information allows for the alignment of the power traces for statistical averaging which provides information regarding the 6-bit key. One skilled in the art will appreciate that power traces are noisy, thus finding instruction signatures and other patterns may not guarantee the success of a DPA attack. However, the instruction signatures and other patterns are available in the prior art for an attacker to use. By destroying these instruction signatures and time patterns, the success of a DPA attack is even more unlikely.

FIG. 2*b* shows the time line with randomized accessing order for the eight SP boxes. As an illustration in FIG. 2*b*, the processing order of SP1 and SP3 has been swapped; similarly for the SP4 and SP6. In this case, it is obvious that a DPA attacker will have to identify these shifting instruction signatures in order to align power traces by re-shuffling the SP box accessing order. After alignment for a given SP box, statistical averaging and other analysis of these power traces can be performed. Thus, the DPA attacker can ultimately align the power traces to determine the 6-bit key.

SUMMARY OF THE INVENTION

In one embodiment the present invention provides a method of inhibiting a successful differential power analysis of a cryptographic device comprising randomly increasing an amount of time required to determine at least one lookup table address; and randomly increasing an amount of time occurring between one access of at least one lookup table and a subsequent access of another lookup table.

In another embodiment, the present invention provides a cryptographic architecture comprising: a processor; a memory module containing an encryption algorithm coupled to said processor; a control flag register coupled to said processor for controlling the state operation of the processor; and a random number generator coupled to said control flag register, wherein said processor sets said control flag register and said random number generator resets said control flag register.

In yet another embodiment, the present invention provides a system for thwarting differential power analysis, said system comprising: means for running an encryption algorithm and means for inserting a random number of pseudo instructions into said encryption algorithm.

In still yet another embodiment, the present invention provides a system for de-correlating side channel information, said system comprising: means for running a Data Encryption Standard (DES) algorithm, said DES algorithm comprising a plurality of substitution/permutation box entry address evaluations and means for inserting a random number of shifting instructions run in each of said plurality of substitution/permutation box entry address evaluations.

In yet another embodiment, the present invention provides a method of altering a power trace of a cryptographic architecture comprising the steps of: running an encryption algorithm; setting a control flag; and performing a random number of instructions when said control flag is set.

DETAILED DESCRIPTION

Figure 1:
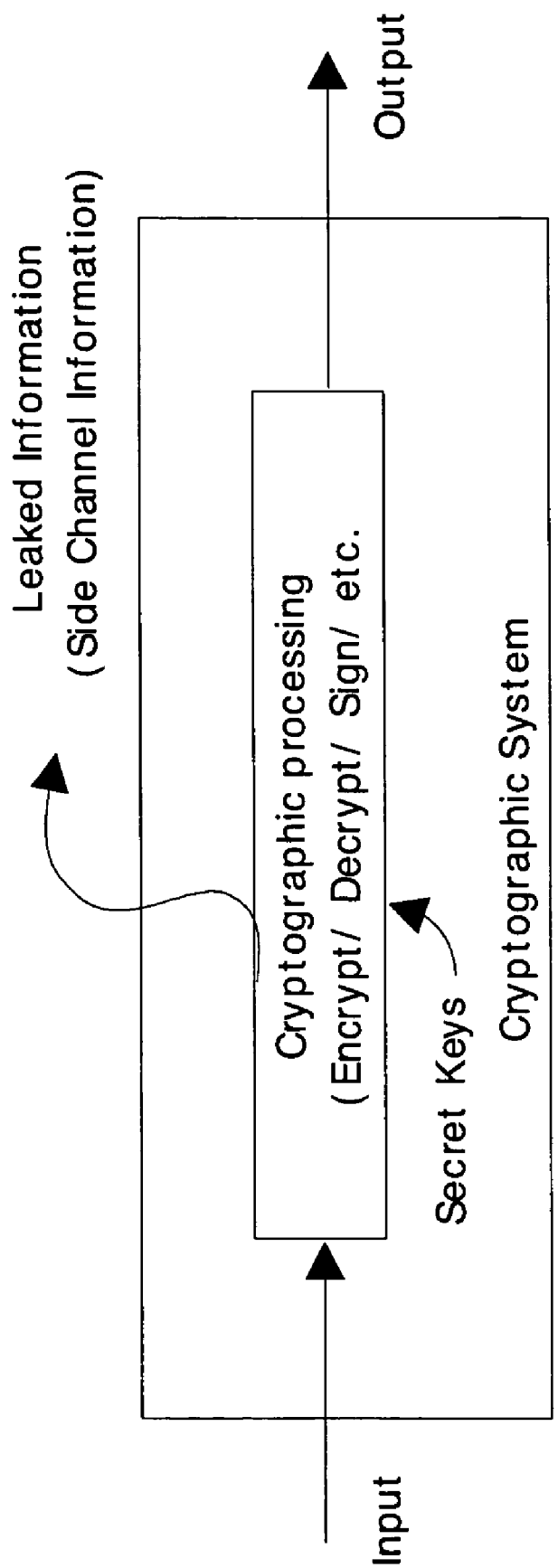
FIG. 1 depicts a prior art diagram of information available to attackers.

The present invention now will be described more fully hereinafter with reference to the accompanying drawings, in which preferred embodiments of the invention are shown. This invention may be embodied in many different forms and should not be construed as limited to the embodiments set forth herein.

In general, any encryption algorithm is a series of instructions executed by a processor (e.g. a CPU). While the inputs and outputs of these instructions will vary, the amount of time required to complete each instruction is determined by the clock speed of the processor or a bus over which the data is transmitted to and from the processor. Different instructions may take more clock cycles than other instructions. The knowledge of the encryption algorithm used to encrypt/decrypt the data provides hackers with knowledge about the timing of the algorithm, i.e. knowledge about which instructions are used and thus how long each instruction should take. This knowledge about timing can then be used to align side channel information. Thus, the side channel information can then be processed by sophisticated statistical approaches that allow the attacker to break the encryption.

A system and method for randomizing the number of instructions within the encryption algorithm is disclosed in U.S. patent application Ser. No. 10/864,569. By randomizing the number of instructions, the instructions within the encryption algorithm are no longer known to the DPA attacker. Therefore, the timing of the algorithm will be unknown to the attackers and they will be unable to align the side channel information. Without the alignment of the side channel information, the sophisticated statistical approaches will fail and the encrypted information will be protected.

The following discussion illustrates how the presently disclosed technology may be incorporated with a system using DES to prevent an attack via DPA. One skilled in the art will appreciate that the present invention may be incorporated into other systems that use other encryption algorithms employing, via this invention, techniques that randomize the time between given instructions. This randomization of time may be used to defeat any attack that relies upon understanding the timing of the algorithm in order to break the encryption.

This disclosure provides information specific to an on-chip Random Instruction Masking (RIM) architecture on a microprocessor that is used to perform cryptographic operations. Furthermore, this disclosure provides an architectural approach for securing existing cryptographic algorithms (including RSA, DES, AES and other non-linear algorithms) from SideChannelAttacks—i.e., attacks based on leaked power information. The motivation is to keep systems secure even though the underlying circuits will always be leaking such information.

A software approach to randomizing the order of the processing of the target bit is not enough to completely secure an algorithm. All instruction signatures or power patterns, which may allow the DPA attackers to reorder the target bits to their original sequences, need to be destroyed. Consequently, one approach is to complement a software approach with hardware protection.

An embodiment of an architectural (hardware) approach to prevent DPA attacks from extracting information correlated to secret keys to the DES or other cryptographic algorithm will now be described. Background information regarding DES is been provided above. While the following illustration is based upon DES, the concepts of protection against DPA apply to any other algorithm that is known to the attacking individuals. We begin by discussing defensive RIM techniques to prevent DPA and related attacks. It is assumed that a DPA selection function can simultaneously select for values of four target bits rather than just one bit because low-level instructions often manipulate four bits (corresponding to each SP box).

Figure 2A:
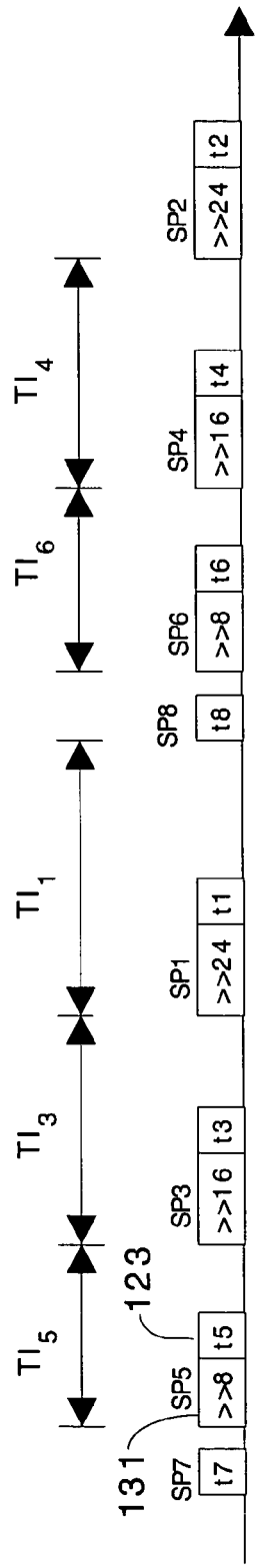
FIG. 2a is a prior art timeline corresponding to the normal accesses of eight SP lookup tables for a given round.
Figure 2B:
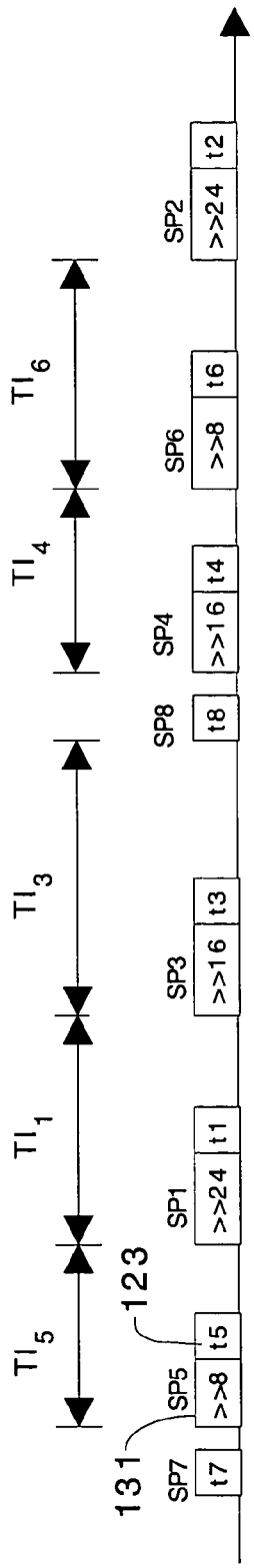
FIG. 2b is a prior art timeline corresponding to a randomized accessing order of the eight SP lookup tables for a given round.
Figure 3:
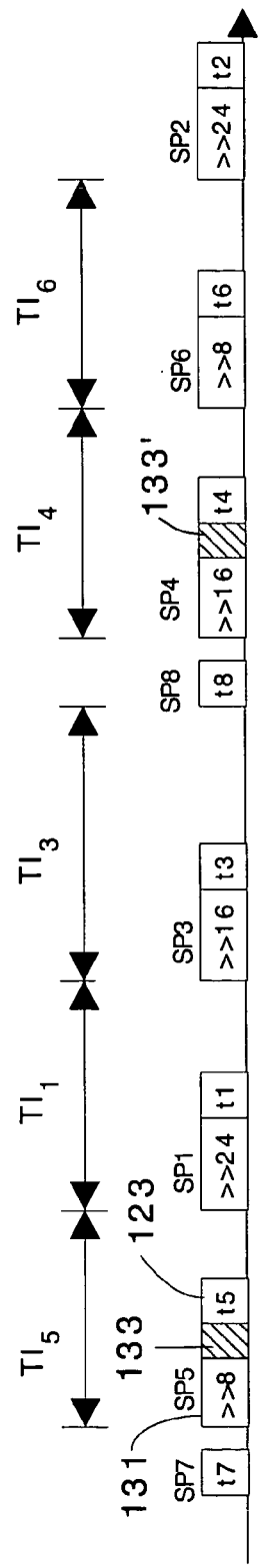
FIG. 3 is a time line with both the time intervals and SP boxes accessing orders being randomized by Random Instruction Masking (RIM) in accordance with the present invention.

FIG. 3 depicts how the time line relationship between SP box's entry address calculation 131 and the generation of a given 4-bit output target 123 may be modified. The modification comprises the insertion of random numbers of pseudo instructions 133 or random numbers of randomized pseudo instructions in each SP box's entry address calculation subroutine. This insertion is described in greater detail in U.S. patent application Ser. No. 10/864,569, mentioned above. As shown in FIG. 3, the insertion of the pseudo shifting instructions 133 or other pseudo instructions 133 changes not only the number of instructions run in each SP box's entry address evaluation, but also the time interval between consecutive SP box access $T_n$. In the example shown in FIG. 3, a random number of pseudo shifting instructions 133 have been inserted in SP5, thus changing the time interval $T_5$ between the access of SP5 and SP1 compared to FIG. 2b. Further, a random number of pseudo instructions 133 are inserted in SP4, thus changing the time interval $T_4$ between the access of SP4 and SP6 compared to FIG. 2b. Of course, a random number of pseudo shifting instructions 133 could also be inserted in one or more of the other SP boxes. The instructions are called 'pseudo' since they preferably mimic the power consumption trace of a real counterpart instruction (and, indeed, in certain embodiments, they may in fact be real instructions), but the execution of the pseudo instruction does not result in any data being updated by the processor.

Due to the insertion of a random number of pseudo instructions 133, both the Shifting Instruction signatures and the time interval signatures are eliminated (camouflaged). This will cause a DPA attacker to be unable to identify which SP box (SP1-SP8) is being accessed in the program. This will make the re-shifting of the SP box access order an effective way of hiding information from DPA attackers; therefore, they can no longer align different power traces to the same reference for statistical averaging and analysis. If the pseudo instructions mimic real shift instructions, then the attacker can find it very difficult to identify which SP box is which. If the pseudo instructions mimic a set of randomized instructions, then the SP boxes may well be very difficult to recognize at all. The attacker may well wonder whether the encryption protocol used by the device is the same protocol that the attacker assumes the attacked device utilizes.

Figure 4:
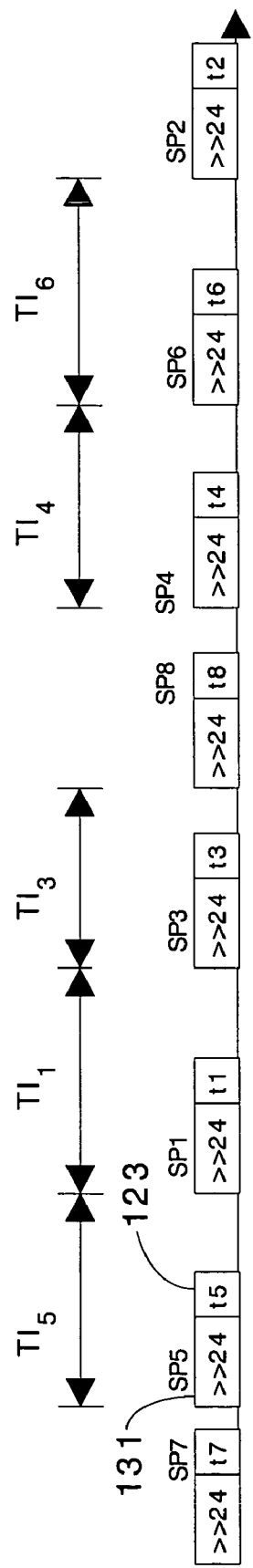
FIG. 4 is a time line with the shifting instructions being equalized in accordance with the present invention.

Instead of randomizing the number of shift instructions run in each (or some) SP box's entry address evaluation, it is possible to equalize the number of shift instructions, such that there appears to be a shift of 24 before each output, as shown in FIG. 4. However, it is preferable to randomize the number of instructions which also randomizes the time interval between each consecutive SP box access. Thus, the randomization thwarts an attacker's use of the time interval as a signature to identify the SP box access. This added uncertainty further complicates the attacker's task.

A modified RISC Processor (CPU) architecture can be used, for example, to generate identical power signatures for both normal instructions and special camouflaged "pseudo" instructions controlled by the Random Instruction Masking (RIM) flag. This specific processor architecture is intended to work in an on-chip cryptographic system embedded with Random Instruction Masking (RIM), and this architecture combined with the S/W-specific RIM concepts, is intended to protect the cryptographic system from piracy through Power Analysis and Differential Power Analysis. Camouflaged instructions are those instructions that have the same instruction code and the same power signature as those typically used in encryption, but when running in this specific processor architecture, will not change the content of any processor register or alter the processor status. The Random Instruction Masking is a technique to create a camouflaged encryption program to protect the cryptographic device from reverse engineering through Power Analysis or Differential Power Analysis.

Figure 5:
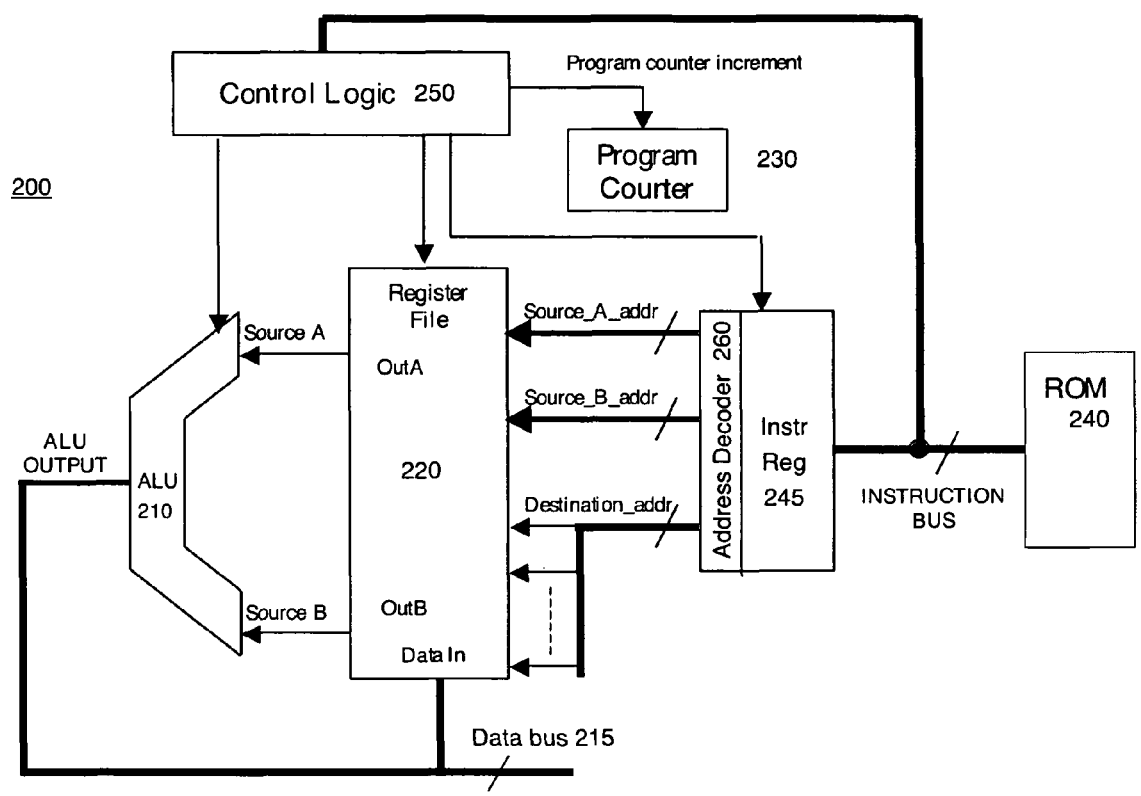
FIG. 5 is a block diagram a prior art RISC CPU.

FIG. 5 is a general (simplified) RISC Processor (CPU) architecture 200. A RISC instruction is an arithmetic or logic function performed by the ALU (Arithmetic Logic Unit) 210 taking two operands from two registers of the Register File 220 and the result of the operation being written back into a third register of the Register File 220 The Register File 220 consists of a number of registers with the same width (number of bits, e.g. 32-bits) that can be accessed with an address selection. In each instruction cycle, the processor gets its instruction sequentially from the ROM 240 and loads it into the Instruction Register 245. The ROM 240 stores all the instruction codes of the whole program including the encryption algorithm. The Control Logic 250 decodes the instruction code in the Instruction Register 245 and gives the correct control commands to the ALU 210 and other parts of the processor 200. Addresses of the operands (Source A and B) and the destination are also defined in the instruction code. An address decoder 260 decodes the address information from the Instruction Register 245 and provides the access control of the specific register in the Register File 220. The ALU 210, controlled by the Control Logic 250, gets the two operands (sources A and B) from the register file 220 with the specified addresses and performs the instruction-specified arithmetic or logical operation. The result of the ALU operation is written back to another register in the Register File 220 with the destination address on a data bus 215. Depending on the type of instructions, a Program Counter 230 that stored the index reference of the instruction in the whole program will be incremented or updated by the Control Logic 250 during the execution of the instruction. Some specific instructions of the processor will not increment or update the Program Counter 230. The updating of some other Flag Registers (not shown) in the processor, similar to the Program Counter 230, is also instruction dependent.

Most modern processors are built in CMOS technology. CMOS circuits do not draw static current so that power is dissipated only when charging and discharging of the load capacitance (switching). The current consumption of a CMOS circuit depends mainly on the capacitive loading, the driving capability of the driver and the frequency of the switching. A complete instruction cycle run in the processor involves the operation of different circuits at different times. Different parts of the processor circuits, due to their differences in device dimension, parasitic loading, and switching speed, will generate a unique current pattern (power signature) with respect to time on the power bus when activated. Power Analysis or Differential Power Analysis (DPA) uses these power signature patterns to correlate the instructions.

Figure 6:
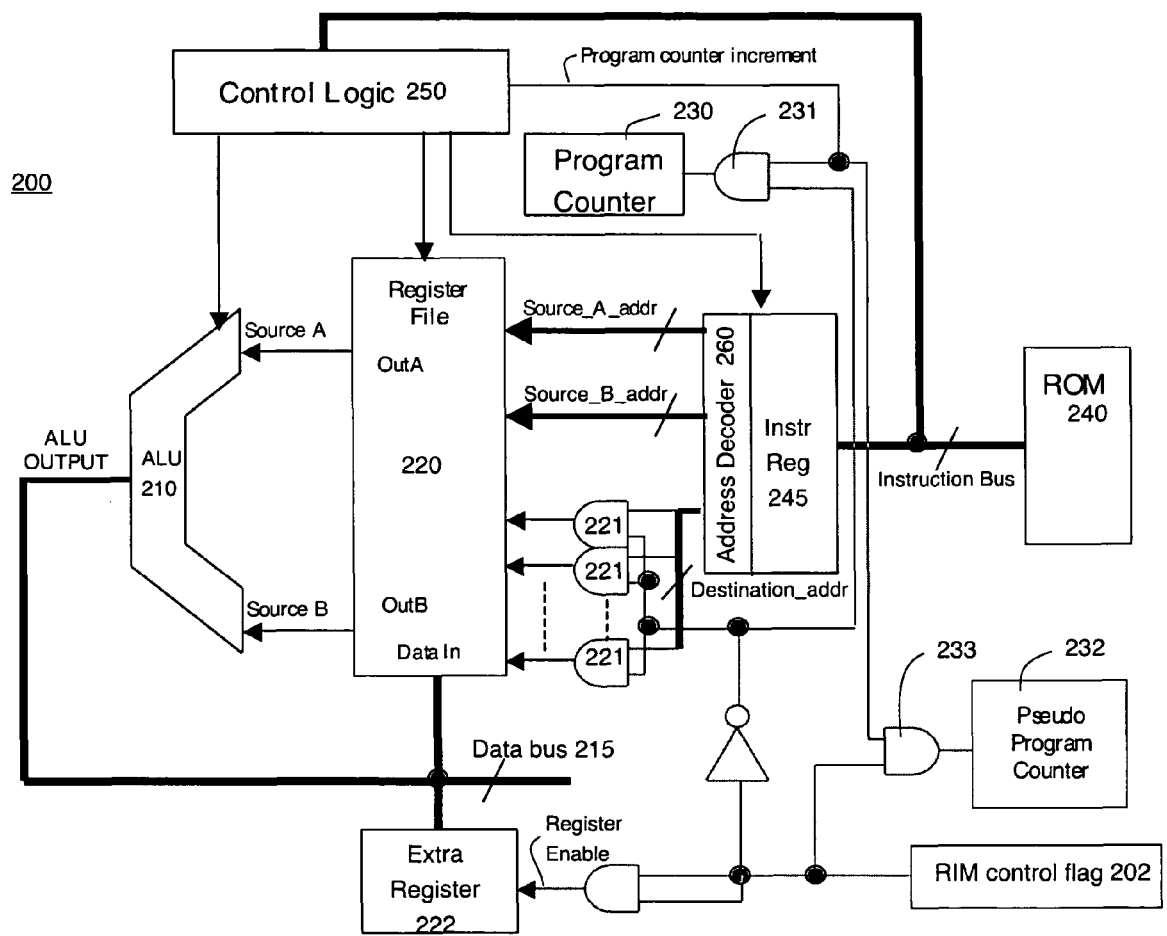
FIG. 6 is a block diagram a RISC CPU in accordance with the present invention.

In U.S. patent application Ser. No. 10/864,569 an embedded Random Instruction Masking (RIM) approach to randomly vary both the number and also the content of the RIM instructions in each SP box's entry address calculation subroutine is disclosed. One very important condition for the RIM approach to successfully prevent DPA attacks is to eliminate any power signature of these RIM instructions. The best way to do this is to make the power signature of the RIM instruction identical to the normal instruction so that they are not differentiable in Power Analysis or Differential Power Analysis (DPA). FIG. 6 shows an improved version of the RISC Processor 200 shown in FIG. 5. A RIM control flag 202 generated from a random number generator 223, for example, controls the activation of the RIM instructions. The random number generator is also depicted in FIG. 5 of U.S. patent application Ser. No. 10/864,569. The RISC Processor of FIG. 6 has extra AND gates compared to the Processor of FIG. 5 for controlling the Destination Address and the Program Counter Increment Enable. An extra register 222 is attached to the data bus 215. This register 222 is designed in such a way that it is identical to a register in the Register File 220 at least from a power consumption viewpoint. A pseudo program counter 232 is also present to duplicate the original Program Counter 230 in the processor in terms of power consumption. While the RIM control flag 202 is set, the pseudo program counter 232 fetches instructions from the ROM 240 and those instructions enter the Instruction Register 245 and are decoded by the Address Decoder 260 as usual. But the results of the instruction are directed to the additional register 222 instead of a register in the Register File 220.

When the RIM control flag 202 equals a logical '0', the processor 200 will be under normal operation (that is, it functions as depicted by FIG. 5 as unmodified). The extra AND gates 221, 231 at the destination address and the program counter just passing the original signals from the Address Decoder 260 and the Control Logic unit 250. At the same time, the added register 222 and the pseudo program counter 232 are disabled. Since all the circuit components involved during the execution of an instruction are the same as in FIG. 5, the power signature (i.e. the consumed current pattern with respect to time) of every instruction run in the modified processor of FIG. 6 will be the same as the processor of FIG. 5.

When the RIM control flag 202 is activated (equal to logical '1'), fetching an instruction from ROM 240, decoding and sourcing the A and B operands from the register file 220, and the operation of the operands in ALU 210 continues on as usual. However, due to the presence of AND gates 221, which are responsive to the state of the RIM flag 202, disable the selection of the destination register in register file 220, none of the destination registers in the register file 220 is selected to receive the results from the ALU 210. Rather, AND gate 223 causes the data on data bus 215 from ALU 210 to be directed to extra register 222 instead. The result is that the ALU is directed to load the results of the instruction being executed into added register 222 instead of one of the normal destination registers in register file 220. Since the physical design of the added register 222 is identical to a destination register in register file 220, the consumed current pattern of loading this added register 222 will be the same as loading the results into a real destination register in the register file 220. The AND gate 223 arranged at the front of the added register is for the purpose of emulating the power of one AND gate 221 used to select one of the destination registers during normal operation. At the same time, the RIM flag 202 also disables the real Program Counter 230, and the pseudo program counter 232 is activated to be incremented or updated. Again, because of the identical physical design between the two program counters 230, 232, the power pattern of incrementing or updating the program counter by the executed instruction will be maintained. At the end of such an instruction cycle, none of the contents in destination registers in register file 220 or the real program counter 230 is modified. That is, the status of the processor 200 remains the same as before this instruction is being executed while the RIM flag 202 is set. When the RIM flag 202 is set, the processor 200 acts, from a data processing standpoint as if it were processing NOP (no operation) instructions. But from a power consumption standpoint, the processor appears to be processing real instructions.

When RIM flag 202 goes back to logical '0', the processor will resume its normal operation to continue running the original program. Whatever instructions (no restriction of what kind) run during RIM flag at logical '1' have no effect on the processor nor the programming other than just producing a camouflage effect of executing an associated normal instruction in the power trace. Thus, the instructions which were fetched when the RIM flag at a logical '1' are basically refetched. Of course, the sequence my vary somewhat since the outcomes of branch instructions could be different. In any event, the processing basically continues from where it was interrupted while the RIM flag at a logical '1'. When this processor with the RIM flag controlled instructions in the SP box address calculation subroutine is used, then the power traces will contain a random variation of the number of certain instructions and also a variety of different kinds of instructions executed in the subroutine. Thus, DPA attackers can no longer identify and align the power traces of the SP box subroutine.

The extra register 222 is a dummy register in that it receives and stores data, but the data received thereby is preferably not used to influence subsequent data processing by processor 200. In FIG. 6 it is shown separated from register file 220, but it could be implemented as a part of register file 220, if desired.

The protection of the RIM control line at the output of the RIM control flag 202 on the chip from direct probing is important. If the RIM control line were easily accessed, some knowledgeable attackers may use this technique to force the RIM control line to be always at logical '0' so as to disable the RIM. A number of camouflage techniques are available to protect the physical design of CMOS circuits from reverse engineering. Using these techniques, the RIM control line can be made very difficult to probe by burying it deep into the silicon implant level and shielding it with actively connected higher Poly and metal layers. It will be very difficult to locate this RIM control line and any attempt to remove the higher protecting layers will damage the functionality of the chip.

The state of the RIM flag 202 is assumed to be at a logical '1' when the pseudo program counter 232 is being used to fetch instructions. As is well known to those skilled in the art, this logic shown on FIG. 6 may be easily modified so the a logical '0' would cause the pseudo program counter 232 to come into play and then a logical '1' would represent normal CPU operation.

The circuit shown in FIG. 6 is not intended for a pipelined ALU. However, it is straightforward to adapt the circuit of FIG. 6 for a pipelined ALU. In general, a pipelined ALU has four stages: prefetch, instruction decode, execute, and writeback. The RIM control signal from the RIM flag may be synchronized with the pipeline through a delay circuit. Thus, the RIM control flag 202 should be synchronized with added register 222, AND gates 221 and pseudo program counter 232 when used with a pipelined ALU.

Of course, a processor 200 may have additional status flag registers that should not be updated when running in RIM mode. The control of such registers may be modified in the same way as the registers (by providing dummy flag registers—analogous to extra register 222—for writing results to when in RIM mode) resulting in a duplicated power signature component for updating these flag registers without really updating them. These flag registers are not depicted in FIG. 6 for the purpose of simplicity.

Within a processor, high capacitive loading and high speed mean that the switching of the data bus and the read/write of the Register File (Memory) will dominate the power consumption. The switching power of updating the flag registers (usually single-bit registers) is not significant in comparison to the total power. Even the program counter switching power may not be significant enough to cause an observable difference in the power traces. Leaving these flag registers untouched may be a convenient way to reduce the extra circuitry required.

Having described the invention in connection with different embodiments thereof, modification will now suggest itself to those skilled in the art. As such, the invention as defined in the appended claims is not to be limited to the disclosed embodiments except as specifically required by the appended claims.

The invention claimed is:

1. A cryptographic CPU architecture comprising:
an ALU;
a control flag;
a plurality of registers for normally receiving output of the ALU in response to an arithmetic instruction;
an additional register for receiving output of the ALU, in lieu of one of the plurality of registers, in response to an arithmetic instruction when the control flag is set;
a first program counter;
a second program counter;
wherein the first and second program counters are responsive to a state of said control flag so that the first program counter is enabled where said control flag is not set and so that the second program counter is enabled where said control flag is set;
wherein an enabled one of said first and second program counter fetches the arithmetic instructions;
wherein either
at least one first arithmetic instruction with the control flag set and at least one second arithmetic instruction with the control flag not set are combined into a substitution-permutation box such that the substitution-permutation box has a number of shifting instructions that is equal to a value set such that all substitution-permutation boxes generated by the cryptographic CPU architecture have the same number of shifting instructions, or
at least one first arithmetic instruction with the control flag set and at least one second arithmetic instruction with the control flag not set are combined into a substitution-permutation box such that the substitution-permutation box has a number of shifting instructions that is equal to a randomly generated value such that all substitution-permutation boxes generated by the cryptographic CPU architecture are separated by a random time interval.

2. The cryptographic CPU architecture of claim 1 wherein the ALU outputs the results of an arithmetic instruction fetched by the first program counter to one of said plurality of registers and the ALU outputs the results of an arithmetic instruction fetched by the second program counter to said additional register.

3. The cryptographic CPU architecture of claim 2 wherein the additional register is a dummy register having no output for transferring data to the ALU.

4. The cryptographic CPU architecture of claim 3 wherein the registers and the additional register each have an associated gate for controlling the transfer of data to the registers and to the additional register, the associated gates being controlled by the state of said control flag.

5. The cryptographic CPU architecture of claim 1 wherein the additional register is a dummy register having no output for transferring data to the ALU.

6. The cryptographic CPU architecture of claim 1 wherein the registers and the additional register each have an associated gate for controlling the transfer of data to the registers and to the additional register, the associated gates being controlled by the state of said control flag.

7. The cryptographic CPU architecture of claim 1, wherein only the first program counter fetches the arithmetic instruction when the control flag is not set and only the second program counter fetches the arithmetic instruction when the control flag is set.

8. A method of concealing data processing occurring in a CPU from power analysis during an execution of a program, the method comprising:
(i) at a point during the execution of the program, inserting a random number of program counter cycles instruction fetch cycles into a substitution-permutation box such that the substitution-permutation box has a selected length such that all substitution-permutation boxes generated have the same number of shifting instructions or each of the substitution-permutation boxes have a randomly generated number of shifting instructions such that all substitution-permutation boxes generated are separated by a random time interval,
(ii) while the random number of instruction fetch cycles are occurring, fetching instructions from memory, executing those instructions in program sequence, but inhibiting updating of normal memory locations based on the execution of those instructions; and
(iii) at the conclusion of said random number of instructions, then recommencing normal program execution by refetching the same instructions which were initially fetched while the random number of instruction fetch cycles were occurring, but when the instructions are refetched, updating memory locations in a normal manner for the CPU.

9. The method of claim 8 wherein the insertion of said random number of program counter cycles instruction fetch cycles is controlled by state of a random instruction mask control flag.

10. The method of claim 8 wherein, while the random number of instruction fetch cycles are occurring, updating a dummy memory location based on the execution of instructions.

11. The method of claim 8 wherein only a first program counter fetches instructions from memory while the random number of instructions fetch cycles are occurring and only a second program counter refetches the same instructions at the conclusion of said random number of instructions.

12. A method of concealing data processing occurring in a CPU from power analysis during an execution of a program composed of a plurality of substitution-permutation boxes of varied cycle lengths, the method comprising:
(i) at a point during the execution of the program, inserting a number of program counter cycles instruction fetch cycles into one or more of the plurality of substitution-permutation boxes; and
(ii) while the number of instruction fetch cycles are occurring, masking power consumption associated with (a) fetching instructions from memory, (b) executing those instructions in program sequence, and (c) writing results to memory registers, by setting the resulting cycle length of the one or more of the plurality of substitution-permutation boxes such that the plurality substitution-permutation boxes have either the same number of shifting instructions or each of the plurality of substitution-permutation boxes have a randomly generated number of shifting instructions such that all substitution-permutation boxes generated are separated by a random time interval.

13. The method of claim 12 wherein only a first program counter fetches instructions when executing the program and only a second program counter fetches instructions while the random number of instructions fetch cycles are occurring.

14. A data processor comprising:
an arithmetic logic unit;
a control flag register;
a plurality of registers for normally receiving output of the arithmetic logic unit in response to substitution-permutation arithmetic instructions and in response to a first state of said control flag register; and
a dummy register for receiving output of the arithmetic logic unit, in lieu of one of the plurality of registers, in response to other arithmetic instructions and in response to a second state of said control flag register, wherein the substitution-permutation arithmetic instructions and the other arithmetic instructions are combined into a substitution-permutation box; and
wherein the data processor sets a total number of shift instructions of the substitution-permutation box either:
such that the substitution-permutation box has a number of shifting instructions that is equal to a value set such that all substitution-permutation boxes have the same number of shifting instructions, or
such that the substitution-permutation box has a number of shifting instructions that is equal to a randomly generated value such that all substitution-permutation boxes have a number of shifting instructions disassociated with the arithmetic instructions such that all substitution-permutation boxes generated are separated by a random time interval.

15. The data processor of claim 14 further comprising: a first program counter;
a second program counter;
the first and second program counters being responsive to the state of said control flag register so that the first program counter is enabled when said control flag register is in said first state and so that the second program counter is enabled when said control flag register is in said second state; and
wherein an enabled one of said first and second program counters fetches instructions from an instruction memory.

16. The data processor of claim 15 wherein the arithmetic logic unit outputs the results of an arithmetic instruction fetched by the first program counter to one of said plurality of registers and the arithmetic logic unit outputs the results of an arithmetic instruction fetched by the second program counter to said dummy register.

17. The data processor of claim 16 wherein the dummy register has no output for transferring data to the arithmetic logic unit.

18. The data processor of claim 17 wherein the registers and the dummy register each have an associated logic gate for controlling the transfer of data to the registers and to the dummy register, the associated logic gates being controlled by the state of said control flag register.

19. The data processor of claim 14 wherein the dummy register has no output for transferring data to the arithmetic logic unit.

20. The data processor of claim 14 wherein the registers and the dummy register each have an associated logic gate for controlling the transfer of data to the registers and to the dummy register, the associated logic gates being controlled by the state of said control flag register.

21. The data processor of claim 14 wherein the other arithmetic instructions are the arithmetic instructions.

22. The data processor of claim 14 further comprising:
a first program counter; and
a second program counter;
wherein the first and second program counters are responsive to a state of said control flag so that when the control flag is in the first state only the first program counter fetches the arithmetic instruction to be processed by the arithmetic logic unit and when the control flag is in the second state only the second program counter fetches the another arithmetic instruction to be processed by the arithmetic logic unit.

23. A cryptographic system comprising:
an ALU;
a control flag;
a dummy register for receiving output of the ALU in response to a first arithmetic instruction when the control flag is set;
a plurality of registers for receiving output of the ALU in response to a second arithmetic instruction when the control flag is not set;
wherein the first arithmetic instruction with the control flag set and the second arithmetic instruction with the control flag not set are combined into a substitution-permutation box;
wherein a total number of shift instructions of the substitution-permutation box is set either:
such that the substitution-permutation box has a power signature that is equal to a value set such that all substitution-permutation boxes have nearly the same power signature, or
such that the substitution-permutation box has a power signature that is equal to a randomly generated value such that all substitution-permutation boxes are separated by a random time interval; and
wherein the plurality of registers and the dummy register each have an associated gate for controlling the transfer of data to the plurality of registers and to the dummy register, wherein both inputs of the gate that is associated with the dummy register are controlled by the state of said control flag and only one input of the gates associated with the plurality of registers are controlled by said control flag.

24. The cryptographic system of claim 23 wherein the first arithmetic instruction is the second arithmetic instruction.

25. The cryptographic system of claim 23 further comprising:
a first program counter;
a second program counter;
wherein the first and second program counters are responsive to a state of said control flag so that when the control flag is set only the first program counter fetches the first arithmetic instruction and when the control flag is not set only the second program counter fetches the second arithmetic instruction.

26. The cryptographic system of claim 23 further comprising:
a first program counter;
a second program counter;
wherein the first and second program counters are responsive to a state of said control flag so that the first program counter is enabled where said control flag is not set and so that the second program counter is enabled where said control flag is set; and wherein an enabled one of said first and second program counter fetches the arithmetic instructions.

27. A cryptographic system comprising:
an ALU;
a memory storing instructions;
a control flag;
a dummy register for receiving output of the ALU in response to the instructions when the control flag is set;
a plurality of registers for receiving output of the ALU in response to the same instruction when the control flag is not set;
wherein either
 at least one first arithmetic instruction with the control flag set and at least one second arithmetic instruction with the control flag not set are combined into a substitution-permutation box such that the substitution-permutation box has a number of shifting instructions that is equal to a value set such that all substitution-permutation boxes generated by the cryptographic CPU architecture have the same number of shifting instructions, or
 at least one first arithmetic instruction with the control flag set and at least one second arithmetic instruction with the control flag not set are combined into a substitution-permutation box such that the substitution-permutation box has a number of shifting instructions that is equal to a randomly generated value such that all substitution-permutation boxes generated by the cryptographic CPU architecture are separated by a random time interval.

28. The cryptographic system of claim 27 further comprising:
a first program counter; and
a second program counter;
wherein the first and second program counters are responsive to a state of said control flag so that when the control flag is set only the first program counter fetches the instruction to be processed by the ALU and when the control flag is not set only the second program counter fetches the same instruction to be processed by the ALU.

29. A cryptographic CPU architecture comprising:
an ALU;
a control flag; and
a plurality of registers for normally receiving output of the ALU in response to an arithmetic instruction;
an additional register for receiving output of the ALU, in lieu of one of the plurality of registers, in response to an arithmetic instruction when the control flag is set;
a first program counter;
a second program counter;
wherein the first and second program counters are responsive to a state of said control flag so that the first program counter is enabled where said control flag is not set and so that the second program counter is enabled where said control flag is set;
wherein an enabled one of said first and second program counter fetches the arithmetic instructions;
wherein
 at least one first arithmetic instruction with the control flag set and at least one second arithmetic instruction with the control flag not set are combined into a substitution-permutation box such that the substitution-permutation box has a number of shifting instructions that is equal to a value set such that all substitution-permutation boxes generated by the cryptographic CPU architecture have the same number of shifting instructions.

* * * * *